United States Patent [19]

Schmitt et al.

[11] 3,723,350

[45] Mar. 27, 1973

[54] PROCESS FOR THE POLYMERIZATION OF OLEFINS

[75] Inventors: Karl Schmitt, Herne; Fritz Gude, Wanne-Eickel, both of Germany

[73] Assignee: Scholven-Chemie AG, kirchen-Buer, Germany

[22] Filed: Aug. 17, 1970

[21] Appl. No.: 64,667

Related U.S. Application Data

[63] Continuation-in-part of Ser. No. 646,426, June 14, 1967, abandoned.

[30] Foreign Application Priority Data

June 16, 1966 Germany....................................39139

[52] U.S. Cl. ..........252/429 C, 260/93.7, 260/94.9 E
[51] Int. Cl. ................................................C08f 1/42
[58] Field of Search ...................................252/429 C

[56] References Cited

UNITED STATES PATENTS 3,308,112   3/1967   Ludlum......................252/429 C UX
3,567,653   3/1971   Wagensommer et al. .........252/429 C
3,047,557   7/1962   Rust et al.......................252/429 C X
3,058,963   10/1962  Vandenberg..................252/429 C X

*Primary Examiner*—Patrick P. Garvin
*Attorney*—Burgess, Dinklage & Sprung

[57]               ABSTRACT

Improved olefin polymerization catalyst made by mixing a titanium tetra halide, a zirconium tetra halide, a titanium tetra ester, a chromium oxyhalide or a mixture thereof with a vanadium oxyhalide or a vanadium tetra halide; reducing such admixture with a dialkylaluminum halide, wherein at least one of the mixture components and/or reductant has a fluorine substituent; and reacting the reduction product with an aluminum trialkyl, and alkyl aluminum halide and/or a dialkyl aluminum halide. In a preferred embodiment, the reaction product is heated to above about 20° C, preferably about 20° to 200° C, to even further improve the catalytic activity thereof.

6 Claims, No Drawings

PROCESS FOR THE POLYMERIZATION OF OLEFINS

This application is a Continuation-in-Part of application Ser. No. 646,426 filed June 14, 1967, abandoned simultaneous with the filing thereof.

This invention relates to the polymerization of α-olefins. More particularly it relates to the polymerization of α-olefins by the use of novel catalysts.

It is in the prior art to polymerize α-olefins such as ethylene, propylene, α-butene etc., and mixtures thereof using therefor catalysts consisting of compounds formed by reacting compounds of metals of Groups IV to VIII with organometallic compounds of metals of Groups I to III of the Periodic System, i.e., the so-called Ziegler catalysts, to thereby form plastics of high molecular weight It is furthermore in the prior art to react mixtures such as of vanadium oxychloride and titanium tetrachloride with aluminum trialkyls, possibly in the presence of boron trifluoride and to use the reaction product as a catalyst for the polymerization of α-olefins (Belgian Pat. No. 617,561). Using only 5 to 600 mg of heavy metal compound per liter of solvent, the polymerization reaction produces good yields of plastic, particularly where the heavy metal catalyst has been precipitated in the presence of boron trifluoride.

The disadvantage of this process is in the requirement for the use of the extremely reactive and expensive boron trifluoride, which can render catalystic manufacture of this kind uneconomical.

It is further more known to utilize as catalyst for the polymerization of α-olefins titanium-vanadium mixtures in combination with considerably reduced compounds such as aluminum trialkyl or lithium aluminum hydride. These catalysts however obtain their effectiveness only at temperatures above 100° C at stages where the polymerization is taking place in solution. As a result their activity is not very great and it becomes absolutely necessary to separately wash the resultant polymerizate in alcohol in order that there be obtained a technically useable product.

It is an object of this invention to provide a catalyst for olefin polymerization prepared in a novel manner which has exceptional catalytic activity.

Other and additional objects of this invention will become apparent from a consideration of this entire specification including the claims hereof.

In accord with and fulfilling these objects, one aspect of this invention resides in a novel technique of preparing an olefin polymerization catalyst. This technique comprises:

A. producing a heavy metal compound admixture of a vanadium halide and/or a vanadium oxyhalide with a member of the group consisting of titanium tetrahalides, titanium tetraesters, zirconium tetrahalides, mixtures thereof, and mixtures thereof with a chromium oxyhalide;

B. reducing such admixture with at least a dialkyl aluminum halide, provided that at least one of the components of mixture A) and/or this reductant is a fluoride; and C. reacting the reduction product with at least one member selected from the group consisting of aluminum trialkyls, aluminum alkyl dihalides and dialkyl aluminum halides.

It has been discovered that the product of this procedure is excellently suited to use as a catalyst for the polymerization of olefins having two to six carbon atoms, particularly α-olefins. Catalysts manufactured as set forth above produce very good rates of olefin, particularly ethylene, polymerization even when used in quantities of less than 1 mg of heavy metal compound per liter of polymerization mixture, including solvent if any. These polymerization rates can be increased considerably by increasing the ethylene, or other olefin if in gas form, pressure.

Alkylaluminum fluorides, whether of the mono or dialkyl variety, can suitably be prepared according to known procedures (see West German Patents 921,450 and 1102151) by reaction of corresponding aluminum (mono odi) alkyl chlorides, bromides or iodides with alkali metal or alkaline earth metal fluorides. Exemplary alkyl aluminum mono and difluorides are diethyl aluminum mono fluoride, di-n-propylaluminum mono fluoride, di-n-butyl aluminum mono fluoride, etc. It is preferred that the alkyl groups have up to about six carbon atoms which may be in normal or isomeric configuration. The dialkyl aluminum fluoride reducing agent may be used in admixture with an aluminum trialkyl and/or an aluminum (mono odi) alkyl (di or mono) halide other than fluoride, particularly chloride. Aluminum trialkyls are generally known materials which may be exemplified by trimethyl aluminum, triethyl aluminum, tri-isopropyl aluminum, tri-n-butyl aluminum, etc. The alkyl groups should preferably have up to about six carbon atoms in normal or isomeric configuration. The aluminum alkyl halides other than fluorides have one or two alkyl substitutents and the complementary number of halide constituents. The alkyl groups are exemplified by those set forth above and may contain up to about six carbon atoms in normal or isomeric configuration. The halides are preferably chloride, bromide or iodide, with chloride being the most preferred.

When mixed dialkyl aluminum fluorides and other aluminum compounds, as set forth above, are used, the other aluminum compounds can comprise up to about 75 mole percent of the mixture, however, the mole ratio of aluminum to heavy metal (regardless of the source or nature of either) should be about 0.5 to 1000.

The reduction treatment can be carried out at about $+ 150°$ to $- 100°$ C preferably about $-50°$ to $+70°$ C. The subsequent reaction of the precipitated reduction product with the aluminum compound or compounds set forth in step C above can be carried out at about 20° to 200° C.

The heavy metal compounds are, as noted above a vanadium halide or oxyhalide and at least one other transition metal compound of the type described. The halide constituents of the heavy metal compounds may be fluoride, chloride, bromide or iodide, preferably chloride. In the case of heavy metal esters, particularly orthoesters, the esterifying alcoholic moiety is preferably lower alkyl, that is up to about six carbon atoms. The heavy metals to which this invention is particularly directed include, in addition to vanadium, titanium, zirconium and chromium. The heavy metal compounds initially changed are exemplified by titanium tetrahalides or esters such as titanium tetrachloride, titanium tetrafluoride, titanium tetra n-propylate, titanium tetra 1-butylate, zirconium tetrachloride, chromium oxychloride, vanadium oxychloride, vanadium tetrachloride and the like. Mixtures of the heavy metal compounds, other than the vanadium compounds, are useful for admixture with the vanadium compounds. Thus, it may be advantageous to use mixtures of titanium tetrachloride and titanium tetra n-propylate, titanium tetrafluoride and titanium tetra n-propylate, titanium tetrachloride and chromium oxychloride, zirconium tetrachloride and titanium tetra n-propylate, etc.

It does not matter whether the heavy metal compound is added to the aluminum alkyl halide compound or whether the aluminum alkyl halide compound is added to the heavy metal compound, either procedure produces equally satisfactory results.

A third method is also possible wherein the aluminum alkyl compound and the mixture of heavy metal compounds are simultaneously fed drop by drop into a vessel in which the formation of the active catalyst takes place.

If a diluent is used in the reaction, any inert liquid is suitable, as for instance, aliphatic hydrocarbons such as hexane, heptane, light gasoline or Fischer-Tropsch diesel oil; cycloalkphatic hydrocarbons such as cyclohexane, hydrocumene etc.; aromatic hydrocarbons such as benzene, toluene etc.; halogenated hydrocarbons such as methylene chloride, chloroform, carbon tetrachloride, ethylene dichloride, etc., or mixtures of these inert liquids.

The formation of the catalyst can, of course, also take place directly in the polymerization vessel. This can be brought about also during the polymerization without fear of adversely affecting the polymerization process.

To activate the catalyst it may be desirable to heat it for some time (e.g., ½ hr to 8 hr) after formation, at temperatures of about 20° to 200° C, preferably 50° to 150° C, perhaps with the addition of fresh aluminum alkyl.

The process of the invention makes it possible to produce catalysts having a degree of activity that has not been achieved hitherto.

Due to the possibility of using very small quantities of heavy metal compounds according to this invention, very economical procedures become possible for the polymerization of α-olefins, particularly those procedures described in Belgian Pat. No. 617,561, in which the washing of the plastic suspension with alcohols and/or water can be dispensed with, which otherwise are customary in Ziegler polymerization. This eliminates any destruction of the still active, soluble aluminum alkyl in the circulating gasoline, along with the separate, expensive recovery of the solvent containing water and/or alcohol. The polymerization can be performed with particularly good effect under elevated pressures ranging up to as much as 150 atmospheres total pressure over the liquid phase in the polymerization reactor.

The prior-art methods of regulating chain length can be used. The adding of hydrogen to the ethylene during the polymerization has proven particularly effective.

The activity of the catalysts of this invention can be increased by finely dividing them during or after formation. This divisions may be accomplished by any suitable known means such as high speed agitators, ball mills, ultrasonic vibrations etc.

This invention will be illustrated by the following Examples.

In these Examples the catalysts were made by mixing the heavy metal compounds indicated in the following tables in a glass flask with agitation under a nitrogen atmosphere at the temperature specified. The solid brown precipitate which was formed, suspended in the indicated liquid, was reduced by the addition thereto of the specified dialkylaluminum-fluoride in the proportions indicated and under the conditions set forth. The reduction product so produced was separated into two or more aliquots, as apparent from the tables, and then used as such or further treated according to this invention. The further treatment was a separation of the solid reduction product from the liquid phase by centrifugation and/or filtration under nitrogen, washing the solid product four times with about 10 times its volume of pure oxy gasoline, and then combining such with a quantity of pure gasoline equal to the amount of the liquid phase originally separated which contains 0.5 g per liter of aluminum diethyl chloride in solution.

All of the heavy metal compounds listed in table I (preparation of catalysts) were reduced and precipitated at at least −30° C using the aluminum or alkyl fluorides as set out in the Table and thereafter reacted with one mole of aluminum diethyl monochloride in the form of an approximately 20 percent solution in benzine per mole of heavy metal com-

TABLE I.—MANUFACTURE OF CATALYSTS

| Catalyst | Substance, 1 g. | Substance, 2 g. | Reduced with— | Forming temp., °C. | Precipitate filtered or washed procedure (c) or (d) | Added after formation (in grams) | Heating temp., °C. | Time, hrs. |
|---|---|---|---|---|---|---|---|---|
| 1a | 4.8 TiCl₄ in 50 ml. | 6.2 VOCl₃ gasoline. | 5.6 g. AlF (C₂H₅)₂ plus 2.5 g. AlCl (C₂H₅)₂ in 40 ml. gasoline. | −30 | No | | | |
| 1b | do | do | do | −30 | No | 8.0 AlCl (C₂H₅)₂ in 1.7 l. gasoline. | 110 | 1 |
| 1b | do | do | do | −30 | No | do | 110 | 3 |
| 1c | do | do | do | −30 | Yes | | | |
| 1d | do | do | do | −30 | Yes | 8.0 AlCl (C₂H₅)₂ in 1.7 l. gasoline. | 110 | 1 |
| 2a | do | do | 7.0 g. AlF (C₂H₅)₂ plus 1.0 g. Al (C₂H₅)₂ in 40 ml. gasoline. | −30 | No | | | |
| 2b | do | do | do | −30 | No | 8.0 AlCl (C₂H₅)₂ in 1.7 l. of gasoline. | 110 | 1 |
| 3a | 2.4 TiCl₄ in 75 ml. gasoline. | 3.1 VOCl₃ | 3.1 g. AlF (C₂H₅)₂ plus 1.0 g. AlCl (C₂H₅)₂ in 20 ml. gasoline. | 0 | No | | | |
| 3b | do | do | do | 0 | No | 4.0 g. AlCl (C₂H₅)₂ in 850 ml. gasoline. | 110 | 1 |
| 4a | do | do | do | +20 | No | | | |
| 4b | do | do | do | +20 | No | 4.0 g. AlCl (C₂H₅)₂ in 850 ml. gasoline. | 110 | 1 | pound and the reaction product produced heated to 100° C for about an hour. After filtering off the precipitated solid by means of suction in the absence of moisture and under nitrogen, the product was thoroughly washed with pure dry benzine and separated off in the form of its suspension in benzine. Just prior to the aforesaid treatment the benzine used as washing and suspension agent had added thereto approximately 1 percent aluminum diethyl chloride.

The following Table II shows further catalyst preparations by the same general technique related above.

TABLE II.—PREPARATION OF CATALYST

| No. | Mol ratios of the heavy metal compounds halogenide | Ti(OR)₄ | V-compound | R= | Type of V-compound | Formed as a 20% solution in benzine | Mol ratio of the heavy metal compound to Al alkyl |
|---|---|---|---|---|---|---|---|
| 5 | TiCl₄, 1 | ᵉ3 | 8 | n-Propyl | VOCl₃ | Diethyl-alfluoride | 1:1.3 |
| 6 | | 1 | ᶠ2 | i-Butyl | VOCl₃ | do | 1:2 |
| 7 | ZrCl₄, 1 | ᵉ1 | 4 | n-Propyl | VOCl₃ | Diisobutyl-al-fluoride | 1:1.3 |
| 8 | TiF₄, 1 | | ᵉ3 | 8 | do | VOCl₃ | Diethyl-alchloride | 1:1.3 |
| 9 | TiCl₄, 3 | CrO₂Cl₂, 1 | | 6 | do | VOCl₃ | Diisobutyl-alfluoride | 1:1.3 |
| 10 | TiCl₄, 1 | | 1.5 | | | VCl₄ | do | 2:1.3 |
| 11 | TiCl₄, 1 | | 1.5 | | | VOCl₃ | {Diisobutyl-alfluoride  {Al-triethyl | 1:0.65  1:0.65 |
| 12 | TiCl₄, 1 | | 1.5 | | | VOCl₃ | {Diisobutyl-alfluoride  {Al-dichlorethyl | 1:0.65  1:0.65 |
| 13 | TiCl₄, 1 | | 1.5 | | | VOCl₃ | Diethyl-alfluoride | 1:1.2 |

Comment with respect to Table II:
  ᵉ Prior to the formation of the catalyst the compounds of Group IV of the Periodic System were heated in benzine (0.16 mole heavy metal compound per liter of benzine) for two hours to a temperature of about 100° C.
  ᶠ Prior to the formation of the catalyst the titanium ortho ester was heated with the vanadium compound in benzine for two hours to a temperature of 100° C. (0.16 mole heavy metal compound mixture/l. benzine).

Catalyst made according to this invention were used in to polymerize ethylene propylene, 4-methyl pentene and butene-1 according to the following examples:

EXAMPLE 1

1 liter of pure, dry gasoline was heated to 40° C in a 2 liter vessel equipped with an agitator, and then 2 g of aluminum triethyl and 50 mg of a catalyst prepared according to Table 1 were added thereto. Then ethylene was introduced and the temperature kept at between 60° and 80° C during the polymerization.

After 3 hours of operation, the ethylene was shut off and the polymer which had formed separated from the gasoline and dried.

The results are shown in the following Table:

TABLE III

YIELD

| Catalyst ref. no. | g/l | g/mg of heavy metal compound | red |
|---|---|---|---|
| 1a | 70 | 1.4 | 28 |
| 1b | 195 | 3.9 | 15 |
| 1b | 226 | 4.5 | 18 |
| 1c | 82 | 1.6 | 30 |
| 1d | 212 | 4.2 | 17 |
| 2a | 46 | 0.9 | 44 |
| 2b | 180 | 3.6 | 19 |
| 3a | 70 | 1.4 | 57 |
| 3a | 88 | 1.0 | - |
| 4a | 70 | 1.4 | 61 |
| 4b | 112 | 2.2 | - |

EXAMPLE 2

10 liters of gasoline were introduced into a 20 liter reactor together with the quantity of aluminum triethyl listed in Table III and the listed amount of heavy metal component. Ethylene was then polymerized at 80° C and 20 percent hydrogen by volume in the gaseous phase of the reactor. The tests showed the following results.

TABLE IV

| Catalyst ref. No. (Table I) | Alum. triethyl (g./l) | Heavy metal component (mg./l) | Pressure (atm.) | H₂, percent | G./l | Yield g./mg. of heavy metal compd. | η red |
|---|---|---|---|---|---|---|---|
| 1b | 2 | 50 | 3 | 20 | 269 | 5.4 | 3.8 |
| 1b | 2 | 20 | 3 | 20 | 166 | 8.3 | 7.5 |
| 1b | 2 | 20 | 5 | 30 | 230 | 11.5 | 4.4 |

EXAMPLE 3

6 liters of gasoline plus 6 g of aluminum triethyl and the quantity of heavy metal component set out in Table IV were used for the polymerization of ethylene in a pressure reactor at about 80° C and a total pressure of 60 atmospheres. The results are shon in the following Table.

TABLE V

| Catalyst ref. No. (Table 1) | Heavy metal component (mg/l) | Pressure (atm.) | H₂ % | g/l | yield g/gm of heavy metal compound | red |
|---|---|---|---|---|---|---|
| 1b | 2.0 | 60 | 0 | 220 | 110 | 68 |
| 1b | 5.0 | 40 | 50 | 140 | 28 | 2.4 |
| 5 | 0.5 | 55 | 0 | 118 | 236 | - |
| 6 | 1.0 | 60 | - | 127 | 127 | - |
| 7 | 1.0 | 65 | - | 130 | 130 | - |
| 8 | 1.0 | 60 | - | 216 | 216 | - |
| 9 | 1.0 | 60 | - | 280 | 280 | - |
| 9 | 2.0 | 60 | 25 | 178 | 89 | 5.5 |
| 10 | 4.0 | 60 | - | 232 | 58 | - |
| 10 | 3.0 | 60 | 20 | 212 | 71 | 6.7 |
| 11 | 3.0 | 60 | 20 | 278 | 93 | 8.1 |
| 12 | 3.0 | 60 | 20 | 228 | 76 | 10.7 |
| 13 | 7.5 | 60 | 30 | 181 | 24 | 1.9 |

EXAMPLE 4

10 mg heavy metal compound (catalyst 5 in Table V) in the form of its suspension in benzine and 1 g aluminum triethyl were introduced with stirring into 1 liter benzine present in a 2 liter reactor which had been rinsed with nitrogen. After the nitrogen had been blown off by means of propylene the polymerization reaction was carried out at a pressure of 16 atmospheres and a temperature of 80° C. At the beginning of the run 150 Nml of hydrogen were introduced into the reactor. After one and one-half hours the reaction was completed. The contents of the reactor were free from benzine by introduction of water vapor and the residue was filtered with suction and dried. The yield amounted to 162 g polypropylene having an $\alpha$ red value of 2.8. 59 percent of the soluble polymerizate could be separated from the polypropylene through extraction with heptane.

EXAMPLE 5

A 2 liter reactor was charged with 1 liter dry pure benzine, 1 g aluminum triisobutyl and 0.15 g heavy metal compound (catalyst 9 table V). 100 g 4-methyl-pentene-1 were pressed into the reactor with stirring at 120° C. After 2 hours the polymerization was substantially complete. In order to remove the benzine, water vapor was introduced. Following removal of the water vapor by distillation the dry polymeric residue was extracted with pentane. There were recovered 40 g of soluble atactic sticky poly-4-methylpentene-1 and 53 g of crystalline poly-4-methyl-pentene-1 which was soluble in pentane.

EXAMPLE 6

50 mole percent ethylene and about 50 mole percent propylene was polymerized at a temperature of about 80° C and an excess pressure of 15 atmospheres in a 5 liter reactor containing 3 liters of pure benzine, 200 mg of heavy metal compound (catalyst 5 table V) and 6 g of aluminum triethyl. After 4 hours the reaction was substantially completed. The benzine was then distilled off with water vapor and after the customary processing 400 g of a mixed polymerizate were obtained.

EXAMPLE 7

45 mg of heavy metal catalyst, 13.3 g of aluminum triethyl and 3 liters cyclohexane were introduced into a 5 liter reactor. Hydrogen, butene-1 and ethylene were introduced into the reactor which was simultaneously heated to a temperature of 80° C and the polymerization was carried out at 3.5 atmospheres. During the reaction, there was maintained in the gaseous phase a concentration of about 5 percent hydrogen. A mixture of 0.5 mole percent butene-1 and ethylene were polymerized. After 5 hours, the reaction was completed. Following further working up in the conventional manner, 203 g of a copolymerizate having a density of 0.46 were obtained.

It will be appreciated that the instant specification and examples are set forth by way of illustration and not limitation and that various modifications and changes may be made without departing from the spirit and scope of the present invention.

What is claimed is:

1. Process of producing an improved olefin polymerization catalyst consisting essentially of:
   A. Mixing a vanadium tetra halide or a vanadium oxyhalide with a member of the group consisting of titanium tetra esters wherein the ester moiety is an alkyl group of one to six carbon atoms, zirconium tetrahalides, mixtures thereof and mixtures thereof with a chromium oxyhalide;
   B. reducing such mixture with aluminum containing reducing agent comprising a dialkyl aluminum halide, provided that at least one component of said mixture A) for this reductant B) is a fluoride; and
   C. reacting said reductant product with at least one member selected from the group consisting of aluminum trialkyls, dialkyls, dialkyl aluminum dihalides.

2. Process as claimed in claim 1 wherein said reduction is carried out at 100° to 150° C.

3. Process as claimed in claim 1 including filtering and washing the reduction product of step B before reacting in step C.

4. Process as claimed in claim 1 wherein said alkyl and the alcoholic portion of said ester are alkyl hydrocarbon of up to six carbon atoms.

5. Process as claimed in claim 1 including heating the product of step C to about 20° to 200° C.

6. The product of the process of claim 1.

* * * * *